US011519330B2

(12) United States Patent
Christie et al.

(10) Patent No.: US 11,519,330 B2
(45) Date of Patent: Dec. 6, 2022

(54) NACELLE FOR GAS TURBINE ENGINE

(71) Applicant: ROLLS-ROYCE plc, London (GB)

(72) Inventors: Robert E Christie, Cranfield (GB);
David G MacManus, Olney (GB);
Christopher T J Sheaf, Derby (GB)

(73) Assignee: ROLLS-ROYCE plc, London (GB)

( * ) Notice: Subject to any disclaimer, the term of this patent is extended or adjusted under 35 U.S.C. 154(b) by 27 days.

(21) Appl. No.: 17/231,130

(22) Filed: Apr. 15, 2021

(65) Prior Publication Data
US 2021/0355873 A1 Nov. 18, 2021

(30) Foreign Application Priority Data

May 13, 2020 (GB) ...................................... 2007011

(51) Int. Cl.
*F02C 7/045* (2006.01)
*B64D 33/02* (2006.01)
*F02K 3/06* (2006.01)

(52) U.S. Cl.
CPC .............. *F02C 7/045* (2013.01); *B64D 33/02* (2013.01); *F02K 3/06* (2013.01); *B64D 2033/0286* (2013.01); *F05D 2220/323* (2013.01); *F05D 2250/511* (2013.01)

(58) Field of Classification Search
CPC . F02C 7/04; F02C 7/045; B64D 33/02; B64D 2033/0286; F02K 3/06; F05D 2220/323; F05D 2250/511
See application file for complete search history.

(56) References Cited

U.S. PATENT DOCUMENTS

| 3,819,008 | A  | * | 6/1974 | Evans | ...................... F02C 7/045 428/116 |
| 8,186,942 | B2 | * | 5/2012 | Haas | ...................... B64D 33/02 244/53 B |
| 2008/0092548 | A1 | * | 4/2008 | Morford | ................... F02K 3/06 60/771 |
| 2015/0360790 | A1 |   | 12/2015 | Rouyre | |
| 2016/0084265 | A1 | * | 3/2016 | Yu | ......................... F04D 29/563 415/177 |
| 2018/0187697 | A1 |   | 7/2018 | Urac et al. | |
| 2020/0102067 | A1 |   | 4/2020 | Qin et al. | |

FOREIGN PATENT DOCUMENTS

| GB | 201815759 | * 11/2018 | ............. B64D 29/00 |
| WO | 02/36951 A1 | 5/2002 | |

OTHER PUBLICATIONS

Jul. 29, 2020 British Search Report issued in British Patent Application No. 2007011.6.

* cited by examiner

*Primary Examiner* — Steven M Sutherland
(74) *Attorney, Agent, or Firm* — Oliff PLC

(57) ABSTRACT

A nacelle for a gas turbine engine having a longitudinal centre line. The nacelle includes an air intake disposed at an upstream end of the nacelle. The air intake includes, in flow series, an intake lip, a throat and a diffuser. The nacelle further includes a protrusion extending radially inward from the air intake downstream of the intake lip. The protrusion extends circumferentially by a protrusion angle ($\theta_p$) with respect to the longitudinal centre line of the gas turbine engine.

8 Claims, 5 Drawing Sheets

NACELLE FOR GAS TURBINE ENGINE

CROSS-REFERENCE TO RELATED APPLICATIONS

This specification is based upon and claims the benefit of priority from United Kingdom patent application number GB 2007011.6 filed on May 13 2020, the entire contents of which is incorporated herein by reference.

BACKGROUND

Technical Field of the Disclosure

The present disclosure relates to a nacelle and in particular to a nacelle for a gas turbine engine.

Description of the Related Art

A gas turbine engine typically includes a fan housed within a nacelle. Current gas turbine engines generally have a low specific thrust to keep noise at acceptable levels and to achieve low fuel consumption, because a low specific thrust helps to improve specific fuel consumption (SFC). This low specific thrust is usually achieved with a high bypass ratio. Therefore, as the specific thrust reduces, there is a concomitant increase in fan diameter. In order to accommodate a larger diameter fan, dimensions of the nacelle may have to be increased proportionally, thereby increasing size of engines. This typically results in a nacelle having increased drag and mass. Increase in drag and mass of the nacelle may both result in an increase in fuel consumption.

For large podded engines, there is a need to reduce the overall nacelle length so that there may be a minimum increase in nacelle drag and mass. This reduction in nacelle length may result in short intakes relative to conventional designs. The short intakes may result in closer interaction between the fan and intake flows. Further, under distorted flow conditions, the close coupled fan induces an asymmetry to the flow distortion distributions.

SUMMARY OF THE DISCLOSURE

According to a first aspect, there is provided a nacelle for a gas turbine engine having a longitudinal centre line. The nacelle includes an air intake disposed at an upstream end of the nacelle. The air intake includes, in flow series, an intake lip, a throat and a diffuser. The nacelle further includes a protrusion extending radially inward from the air intake downstream of the intake lip. The protrusion extends circumferentially by a protrusion angle with respect to the longitudinal centre line of the gas turbine engine. The protrusion angle is greater than or equal to 1 degree and less than or equal to 180 degrees.

In some embodiments, the air intake extends axially by an intake length ($L_{int}$) with respect to the longitudinal centre line. The protrusion extends axially by a protrusion length ($L_p$) with respect to the longitudinal centre line. The protrusion length ($L_p$) is greater than or equal to 0.01 $L_{int}$ and less than or equal to 0.99 $L_{int}$.

In some embodiments, the throat extends radially by a throat radius ($R_{th}$) with respect to the longitudinal centre line.

In some embodiments, the nacelle further includes a fan section downstream of and adjacent to the diffuser. The fan section extends radially by a fan radius ($R_{fan}$) with respect to the longitudinal centre line.

In some embodiments, the protrusion extends radially inward from the air intake by a protrusion height ($H_p$). The protrusion height ($H_p$) is greater than or equal to $0.1(R_{fan} - R_{th})$ and less than or equal to $(R_{fan} - R_{th})$.

In some embodiments, the protrusion has a convex shape.

In some embodiments, the protrusion is downstream of the throat.

In some embodiments, the nacelle is used in the gas turbine engine of an aircraft.

In some embodiments, the gas turbine includes a fan received within the nacelle. The fan may be received within the fan section of the nacelle.

In some embodiments, the gas turbine further includes an engine core received within the nacelle.

The protrusion may result in an asymmetric configuration of the air intake of the nacelle. In some cases, the protrusion may result in port starboard asymmetry of the air intake of the nacelle. The protrusion may mitigate an impact of the fan on a flow distortion within the air intake. Various parameters of the protrusion, for example, the protrusion angle, the protrusion length and the protrusion height, may be optimized to minimize an impact of a flow field induced by the fan on the flow distortion. Therefore, the nacelle including the protrusion may prevent or inhibit close interaction between the fan and intake flows that may otherwise occur in conventional nacelle designs. Consequently, an asymmetry of flow distortion distributions may be reduced. Further, a nacelle with a shorter intake may be used while inhibiting close interaction between the fan and the intake flows. This may allow the nacelle to be used in large podded engines with larger fan diameters.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

According to an aspect, there is provided an aircraft comprising a gas turbine engine as described and/or claimed herein. The aircraft according to this aspect is the aircraft for which the gas turbine engine has been designed to be attached.

According to an aspect, there is provided a method of operating a gas turbine engine as described and/or claimed herein.

According to an aspect, there is provided a method of operating an aircraft comprising a gas turbine engine as described and/or claimed herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
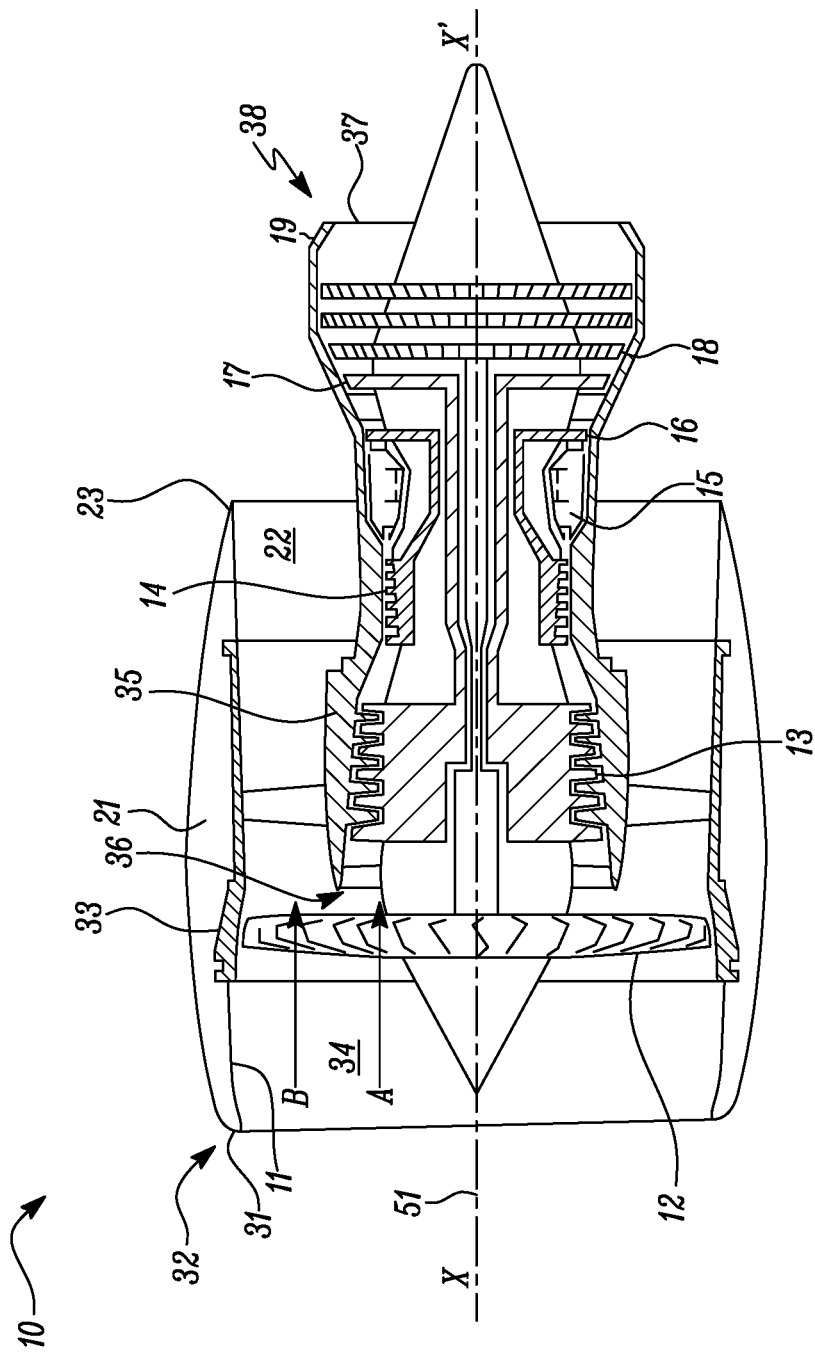
FIG. 1 is a sectional side view of a gas turbine engine.

FIG. 1 shows a ducted fan gas turbine engine 10 having a principal rotational axis X-X'. The principal rotational axis X-X' coincides with a longitudinal centre line 51 of the gas turbine engine 10.

In the following disclosure, the following definitions are adopted. The terms "upstream" and "downstream" are considered to be relative to an air flow through the gas turbine engine 10. The terms "axial" and "axially" are considered to relate to the direction of the principal rotational axis X-X' of the gas turbine engine 10.

The gas turbine engine 10 includes, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core exhaust nozzle 19. A nacelle 21 generally surrounds the gas turbine engine 10 and defines the air intake 11, a bypass duct 22 and a bypass exhaust nozzle 23.

During operation, air entering the air intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the first air flow A directed into it before delivering that air to the high pressure compressor 14 where further compression takes place.

The compressed air exhausted from the high-pressure compressor 14 is directed into the combustion equipment 15 where it is mixed with fuel and the mixture is combusted. The resultant hot combustion products then expand through, and thereby drive the high, intermediate and low-pressure turbines 16, 17, 18 before being exhausted through the core exhaust nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

In some embodiments, the gas turbine engine 10 is used in an aircraft. In some embodiments, the gas turbine engine 10 is an ultra-high bypass ratio engine (UHBPR).

The nacelle 21 further includes an intake lip 31 disposed at an upstream end 32 of the nacelle 21, a fan casing 33 downstream of the intake lip 31, a diffuser 34 disposed between the upstream end 32 and the fan casing 33, and an engine casing 35 downstream of the intake lip 31. The fan 12 is received within the fan casing 33. The nacelle 21 further includes a fan section 39 downstream of and adjacent to the diffuser 34. The fan casing 33 is disposed in the fan section 39. Further, the fan 12 is received within the fan section 39. The air intake 11 includes, in flow series, the intake lip 31, a throat 40 and the diffuser 34. The throat 40 is disposed at an interface between the intake lip 31 and the diffuser 34.

An engine core 36 of the gas turbine engine 10 including the intermediate pressure compressor 13, the high-pressure compressor 14, the combustion equipment 15, the high-pressure turbine 16, the intermediate pressure turbine 17, the low-pressure turbine 18 and the core exhaust nozzle 19 is received within the nacelle 21. Specifically, the engine core 36 is received within the engine casing 35. The nacelle 21 further includes an exhaust 37 disposed at a downstream end 38 of the nacelle 21. The exhaust 37 may be a part of the engine casing 35. The exhaust 37 may at least partly define the core exhaust nozzle 19.

The nacelle 21 for the gas turbine engine 10 may be typically designed by manipulating a plurality of design variables. The selection of the design variables may be dependent on a cruise Mach speed of an aircraft the nacelle 21 is attached to, as well as considerations for integration of engine ancillaries, such as a thrust reversal unit (TRU). Optimisation of these variables may be required to minimise the cruise drag incurred due to size and design of the nacelle 21.

Figure 2:
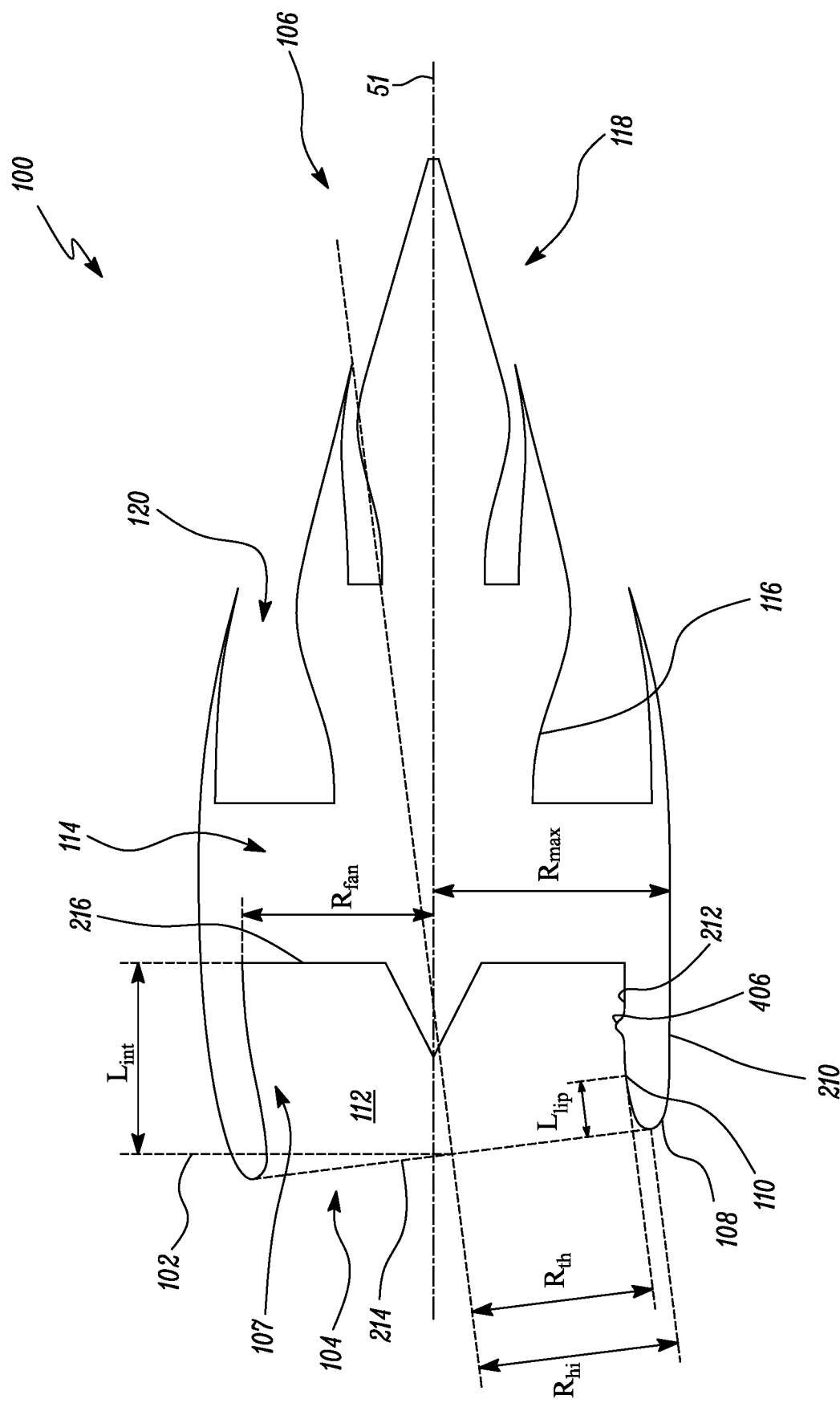
FIG. 2 is a schematic sectional side view of a nacelle of the gas turbine engine.

FIG. 2 illustrates a nacelle 100 for the gas turbine engine 10 (shown in FIG. 1) having the longitudinal centre line 51 in accordance with an embodiment of the present disclosure. The nacelle 100 may be formed using any suitable material. for example, the nacelle 100 may formed as a metal forging, with the metal being selected from the group comprising steel, titanium, aluminium and alloys thereof. Optionally, the nacelle 100 may be formed from a fibre reinforced composite material, with the composite fibre being selected from the group comprising glass, carbon, boron, aramid and combinations thereof. An advantage of using a fibre reinforced composite material to form the nacelle 100 is that its weight may be reduced over a nacelle formed from a metallic material.

As shown in FIG. 1, the longitudinal centre line 51 coincides with the principal rotational axis X-X' of the gas turbine engine 10. As shown in FIG. 2, the nacelle 100 further defines a reference line 102 perpendicular to the longitudinal centre line 51. The longitudinal centre line 51 is also illustrated in FIG. 2.

Referring to FIG. 2, the nacelle 100 generally has a tubular structure including an upstream end 104 and a downstream end 106 opposite to the upstream end 104. The nacelle 100 includes an air intake 107 disposed at the upstream end 104 of the nacelle 100. The air intake 107 of the nacelle 100 includes, in flow series, an intake lip 108, a throat 110 and a diffuser 112. The intake lip 108 is disposed at the upstream end 104 of the nacelle 100. The throat 110 is positioned adjacent to the intake lip 108 in the direction of air flow along the longitudinal centre line 51. The nacelle 100 further includes a fan section 114. The fan 12 (shown in FIG. 1) is received within the fan section 114. The fan section 114 is disposed downstream of and adjacent to the diffuser 112. The diffuser 112 is disposed between the upstream end 104 and the fan section 114. The nacelle 100 further includes an engine casing 116 disposed downstream of the fan section 114. The engine core 36 (shown in FIG. 1) is received within the engine casing 116. The engine casing 116 surrounds the engine core 36. The nacelle 100 further incudes an exhaust 118 disposed at the downstream end 106 of the nacelle 100. In some embodiments, the nacelle 100 may be used in the gas turbine engine 10 (shown in FIG. 1) in an aircraft.

The nacelle 100 is generally terminated by the exhaust 118 whose outlet is located downstream of the engine casing 116. The exhaust 118 may exhaust the resultant hot combustion products from the combustion equipment 15 (shown in FIG. 1) of the gas turbine engine 10. The nacelle 100 may include a cowling disposed proximal to the downstream end 106. The cowling may be able to accommodate ancillaries, such as a TRU. The TRU may be any type, for example, target type, clam-shell type or cold stream type. The nacelle 100 further includes a bypass nozzle 120 disposed proximal to the downstream end 106. The bypass nozzle 120 may exhaust the bypass air from the fan 12 (shown in FIG. 1).

The intake lip 108, the throat 110 and the diffuser 112 forms the air intake 107 to supply air to the fan 12 (shown in FIG. 1) of the gas turbine engine 10 during operation of the engine 10. The air intake 107 may be further required to absorb noise generated by the gas turbine engine 10. The diffuser 112 may be sized and configured for reducing velocity of the airflow while increasing its static pressure.

In the illustrated embodiment, the intake lip 108 is scarfed with a positive scarf angle. However, in other embodiments, the intake lip 108 may have zero or negative scarf. The nacelle 100 may optionally be drooped.

The nacelle 100 further includes an outer surface 210, an inner surface 212 and a highlight 214. Each of the inner surface 212 and the outer surface 210 may be generally annular. The highlight 214 may form a boundary between the outer surface 210 and the inner surface 212 at the intake lip 108. The highlight 214 may define an annular upstream edge of the nacelle 100. Specifically, the highlight 214 may define the upstream edge of the intake lip 108. The highlight 214 further defines a highlight radius $R_{hi}$ of the nacelle 100. The throat 110 and the diffuser 112 are defined by the inner surface 212 of the nacelle 100.

The throat 110 is disposed at an interface between the intake lip 108 and the diffuser 112. The throat 110 extends radially by a throat radius $R_{th}$ with respect to the longitudinal centre line 51. The fan section 114 extends radially by a fan radius $R_{fan}$ with respect to the longitudinal centre line 51. The throat radius $R_{th}$ is less than the highlight radius $R_{hi}$. The nacelle 100 extends radially by a maximum radius $R_{max}$. The maximum radius $R_{max}$ is defined by the outer surface 210 of the nacelle 100 at the fan section 114.

The air intake 107 extends axially by an intake length $L_{int}$ with respect to the longitudinal centre line 51. The fan section 114 is disposed downstream of the intake lip 108. The fan section 114 includes a fan section leading edge 216. The fan section leading edge 216 may be an upstream edge of the fan section 116 facing the intake lip 108. The intake length $L_{int}$ is defined between the highlight 214 and the fan section leading edge 216. The intake length $L_{int}$ may be defined along the longitudinal centre line 51. The intake lip 108 extends by a lip length $L_{lip}$. The lip length $L_{lip}$ may be generally parallel to the longitudinal centre line 51.

As shown in FIG. 2, the nacelle 100 further includes a protrusion 406 extending radially inward from the air intake 107 downstream of the intake lip 108.

Figure 3:
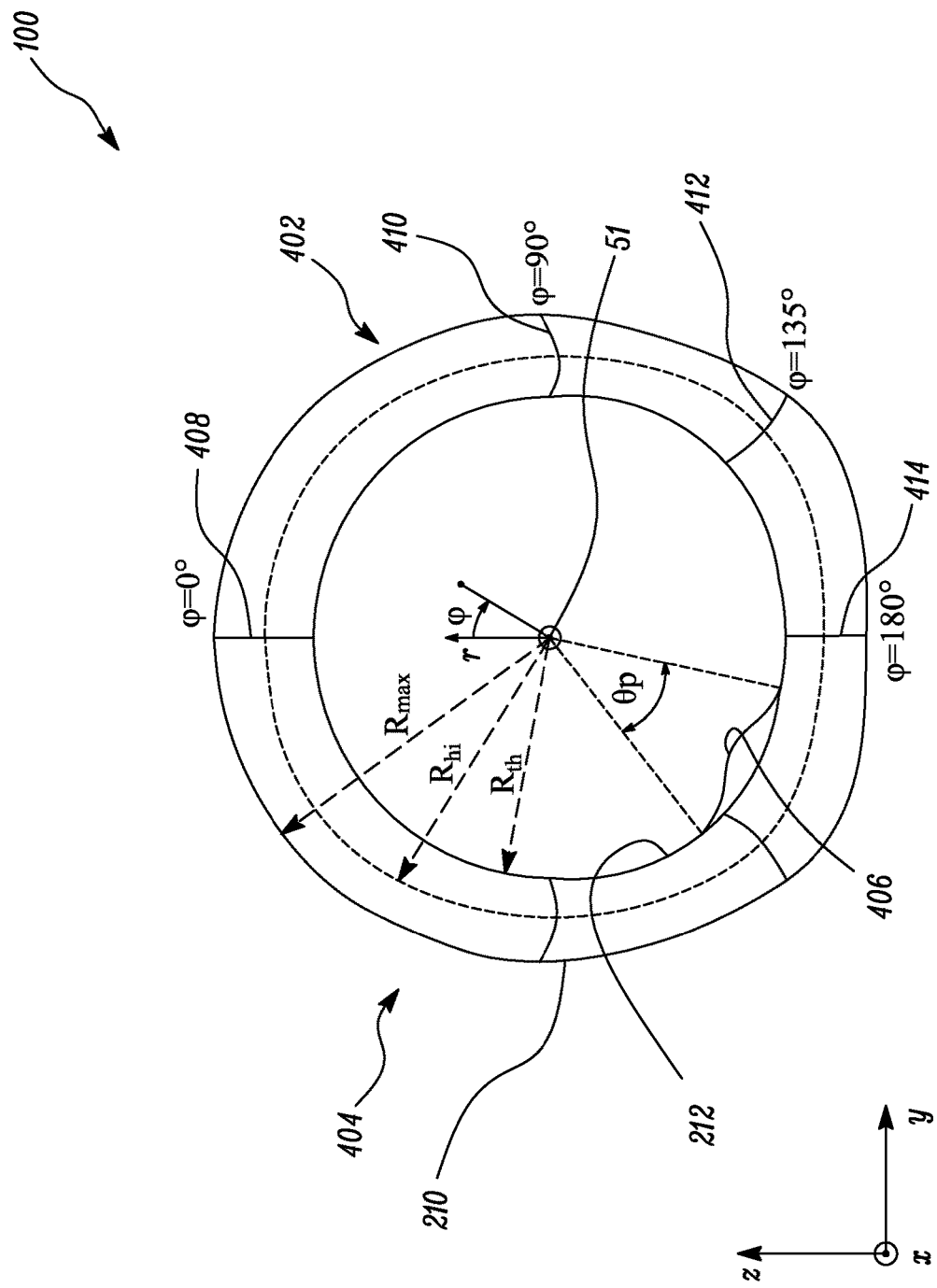
FIG. 3 is a front view of the nacelle of FIG. 2 including a protrusion.

Referring to FIG. 3, a front view of the nacelle 100 is illustrated. The nacelle 100 defines a port side 402 and a starboard side 404 opposite to the port side 402. The nacelle 100 further defines a radial direction r and an azimuthal angle φ. The radial direction r is shown in a radially inner direction. Further, the azimuthal angle φ is shown in a clockwise direction. The azimuthal angle φ denotes a circumferential direction about the longitudinal centre line 51. The nacelle 100 further defines three mutually orthogonal axes x, y and z. The x-axis is generally parallel to the longitudinal centre line 51. The y-axis is defined along a generally horizontal direction, while the z-axis is defined along a generally vertical direction. The throat 110 defines the throat radius $R_{th}$. The highlight 214 defines the highlight radius $R_{hi}$. The maximum radius $R_{max}$ is also shown in FIG. 3. The nacelle 100 further defines axial lines at different values of the azimuthal angle φ. For example, the nacelle 100 defines a top line 408 at φ=0 degree, a side line 410 at φ=90 degree, a control line 412 at φ=135 degree and a bottom line 414 at φ=180 degree. The different axial lines may be used to define the air intake 107. The throat radius $R_{th}$, the highlight radius $R_{hi}$, and the maximum radius $R_{max}$ vary azimuthally. Specifically, the throat radius $R_{th}$, the highlight radius $R_{hi}$, and the maximum radius $R_{max}$ may be a function of the azimuthal angle φ.

In the illustrated embodiment of FIG. 3, the nacelle 100 has an asymmetric configuration. The nacelle 400 includes the protrusion 406 extending radially inward from the air intake 107. Specifically, the protrusion 406 extends radially inward from the air intake 107 downstream of the intake lip 108. Specifically, the protrusion 406 extends radially inward from the inner surface 212 of the nacelle 100 and is disposed in the air intake 107 downstream of the intake lip 108. The protrusion 406 extends circumferentially by a protrusion angle $\theta_p$ with respect to the longitudinal centre line 51 of the gas turbine engine 10 (shown in FIG. 1). The protrusion angle $\theta_p$ corresponds to an azimuthal extent of the protrusion 406. The protrusion angle $\theta_p$ further corresponds to a value of the azimuthal angle φ. In some embodiments, the protrusion angle $\theta_p$ is greater than or equal to 1 degree and less than or equal to 180 degrees (i.e., $1° \leq \theta_p \leq 180°$. The protrusion 406 is further located downstream of the throat 110. The protrusion 406 has a convex shape relative to the inner surface 212 of the nacelle 100.

The protrusion 406 may be an inverted bump that imparts an asymmetric shape to the nacelle 100 and the air intake 107. In the illustrated embodiment, the protrusion 406 is provided on the starboard side 404 of the nacelle 400. The air intake 107 may therefore have an asymmetric shape due to the inclusion of the protrusion 406. In other words, the air intake 107 may have a port starboard asymmetry due to the protrusion 406. In an alternate embodiment, the protrusion 406 may be provided on the port side 402 instead of the starboard side 404 of the nacelle 400.

Figure 4:
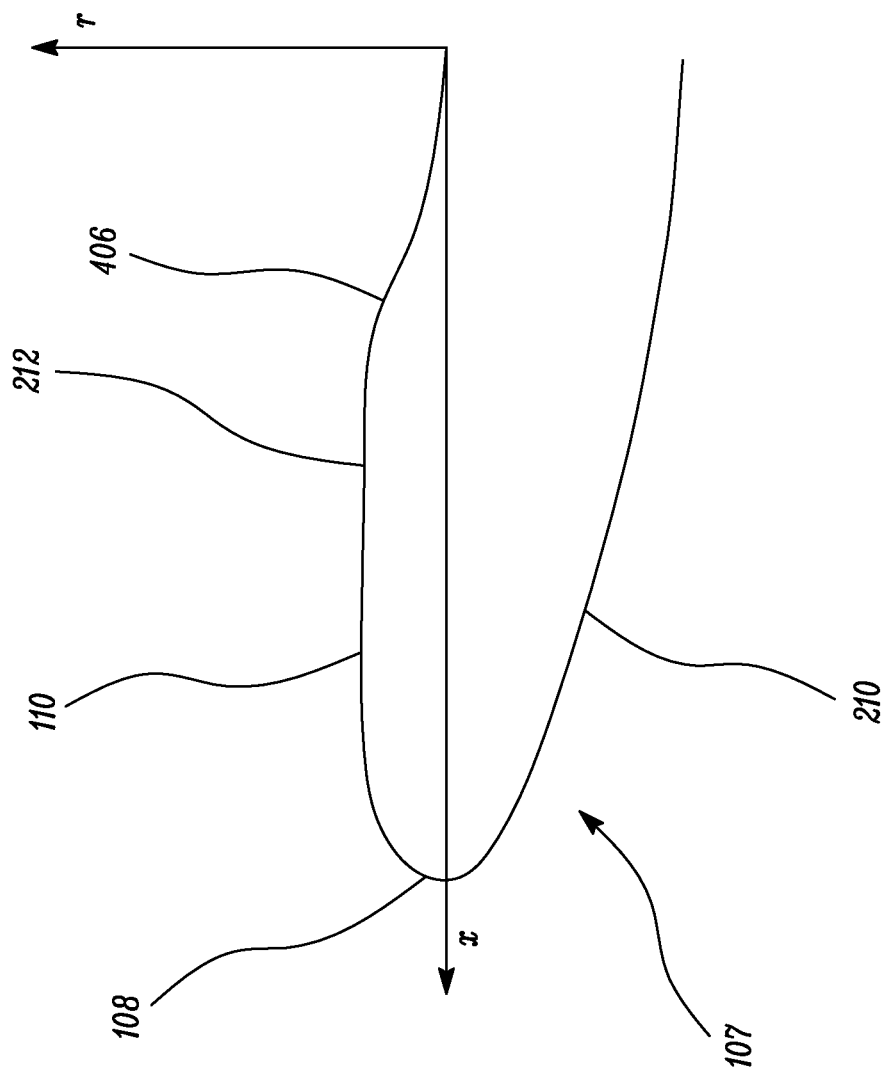
FIG. 4 is a schematic side sectional view of an air intake of the nacelle including the protrusion.

FIG. 4 illustrates a side sectional view of the air intake 107. The air intake 107 extends axially along x-axis that is parallel to the longitudinal centre line 51 of the gas turbine engine 10 (shown in FIG. 1). The radial direction r is also shown in FIG. 4.

The air intake 107 includes the intake lip 108, the throat 110, the diffuser 112 and the protrusion 406. The protrusion 406 extends radially inward along the radial direction r from the diffuser 112. The protrusion 406 further extends from the inner surface 212 of the nacelle 100. The protrusion 406 is disposed downstream of the throat 110 and the intake lip 108.

Figure 5:
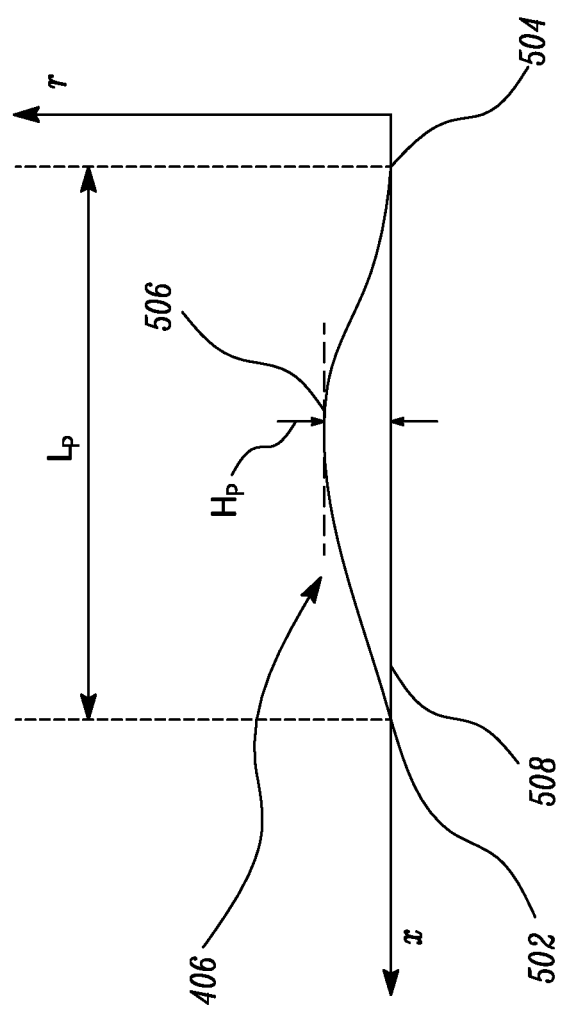
FIG. 5 is a detailed side sectional view of the protrusion of the nacelle.

FIG. 5 illustrates a detailed view of the intake lip 108. The x-axis and the radial direction r are also shown in FIG. 5. The protrusion 406 includes an upstream end 502, a downstream end 504 and a peak 506 disposed axially between the upstream end 502 and the downstream end 504. The protrusion 406 is further defined with respect to a baseline 508 extending along the x-axis. The baseline 508 may correspond to the inner surface 212 of the nacelle 100 (shown in FIG. 2) without any protrusion. In other words, the baseline 508 corresponds to the air intake 107 (shown in FIG. 4) without any protrusion. The protrusion 406 may curve upwardly from the upstream end 502 to the peak 506. The protrusion 406 may further curve downwardly from the peak 506 to the downstream end 504.

With reference to FIG. 5, the protrusion 406 extends axially by a protrusion length $L_P$ with respect to the x-axis and the longitudinal centre line 51 (shown in FIG. 2).

Specifically, the protrusion 406 has the protrusion length $L_P$ along the x-axis and the longitudinal centre line 51. The protrusion length is measured from the upstream end 502 to the downstream end 504.

The protrusion length $L_P$ may be related to the intake length $L_{int}$ of the air intake 107 (shown in FIG. 2). In some embodiments, the protrusion length $L_P$ is greater than or equal to 0.01 $L_{int}$ and less than or equal to 0.99 $L_{int}$ (i.e., 0.01 $L_{int} \leq L_P \leq 0.99 \, L_{int}$).

Furthermore, the protrusion 406 extends radially inward from the air intake 107 by a protrusion height $H_P$. In other words, the protrusion 406 has the protrusion height $H_P$ in the radial direction r. The height $H_p$ may be a maximum distance between the protrusion 406 and the baseline 508 along the radial direction r. Further, the height $H_p$ may be measured between the peak 506 of the protrusion 406 and the baseline 508.

The protrusion height $H_P$ may be related to the fan radius $R_{fan}$ and the throat radius $R_{th}$ of the nacelle 100 (shown in FIG. 2). In some embodiments, the protrusion height $H_P$ is greater than or equal to $0.1(R_{fan}-R_{th})$ and less than or equal to $(R_{fan}-R_{th})$, i.e., $0.1(R_{fan}-R_{th}) \leq H_P \leq (R_{fan}-R_{th})$.

Thus, the protrusion 406 may extend radially inward along the radial direction R as well as axially along the x-axis. In other words, the protrusion 406 may extend radially inward as well as axially relative to the longitudinal centre line 51 of the gas turbine engine 10 (shown in FIG. 1).

The protrusion 406 may result in an asymmetric intake of a nacelle. Referring to FIGS. 1-5, the protrusion 406 may result in port starboard asymmetry of the air intake 107 of the nacelle 100. The protrusion 406 may mitigate an impact of the fan 12 on a flow distortion within the air intake 107. The various parameters of the protrusion 406, for example, the protrusion angle $\theta_p$, the protrusion length $L_P$ and the protrusion height $H_P$, may be optimized to minimize an impact of a flow field induced by the fan 12 on the flow distortion. Therefore, the nacelle 100 including the protrusion 406 may prevent or inhibit close interaction between the fan 12 and intake flows that may otherwise occur in conventional nacelle designs. Consequently, an asymmetry of flow distortion distributions may be reduced. Further, the intake length $L_{int}$ of air intake 107 may be decreased while inhibiting close interaction between the fan and the intake flows. Such reduction of the intake $L_{int}$ may enable the nacelle 100 to be used in large podded engines.

The nacelle 100 with the protrusion 406 may be suitable for use as an underwing-podded nacelle of an aircraft. It should be noted that the present disclosure does not limit the nacelle 100 to be in an underwing-podded configuration. The present disclosure also does not limit the type of gas turbine engine used with the nacelle 100.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A nacelle for a gas turbine engine having a longitudinal center line, the nacelle comprising:
    an air intake disposed at an upstream end of the nacelle, the air intake comprising, in flow series, an intake lip, a throat and a diffuser; and
    a protrusion extending radially inward from the air intake downstream of the intake lip, wherein the protrusion extends circumferentially by a protrusion angle ($\theta_p$) with respect to the longitudinal center line of the gas turbine engine, and wherein the protrusion angle ($\theta_p$) is greater than or equal to 1 degree and less than or equal to 180 degrees,
    wherein the protrusion has a convex shape, and
    wherein the protrusion is downstream of the throat.

2. The nacelle of claim 1, wherein the air intake extends axially by an intake length ($L_{int}$) with respect to the longitudinal center line, and wherein the protrusion extends axially by a protrusion length ($L_p$) with respect to the longitudinal center line, and wherein $L_p$ is greater than or equal to 0.01 $L_{int}$ and less than or equal to 0.99 $L_{int}$.

3. The nacelle of claim 1, wherein the throat extends radially by a throat radius ($R_{th}$) with respect to the longitudinal center line.

4. The nacelle of claim 3, further comprising a fan section downstream of and adjacent to the diffuser, wherein the fan section extends radially by a fan radius ($R_{fan}$) with respect to the longitudinal center line.

5. The nacelle of claim 4, wherein the protrusion extends radially inward from the air intake by a protrusion height ($H_p$), and wherein $H_p$ is greater than or equal to $0.1(R_{fan}-R_{th})$ and less than or equal to $(R_{fan}-R_{th})$.

6. A gas turbine engine for an aircraft, the gas turbine engine comprising a nacelle according to claim 1.

7. The gas turbine engine of claim 6, further comprising a fan received within the nacelle.

8. The gas turbine engine of claim 7, further comprising an engine core received within the nacelle.

* * * * *